INVENTORS
ORVILLE E. HEADY
RICHARD L. STANDIFER
JOHN F. TOWELL

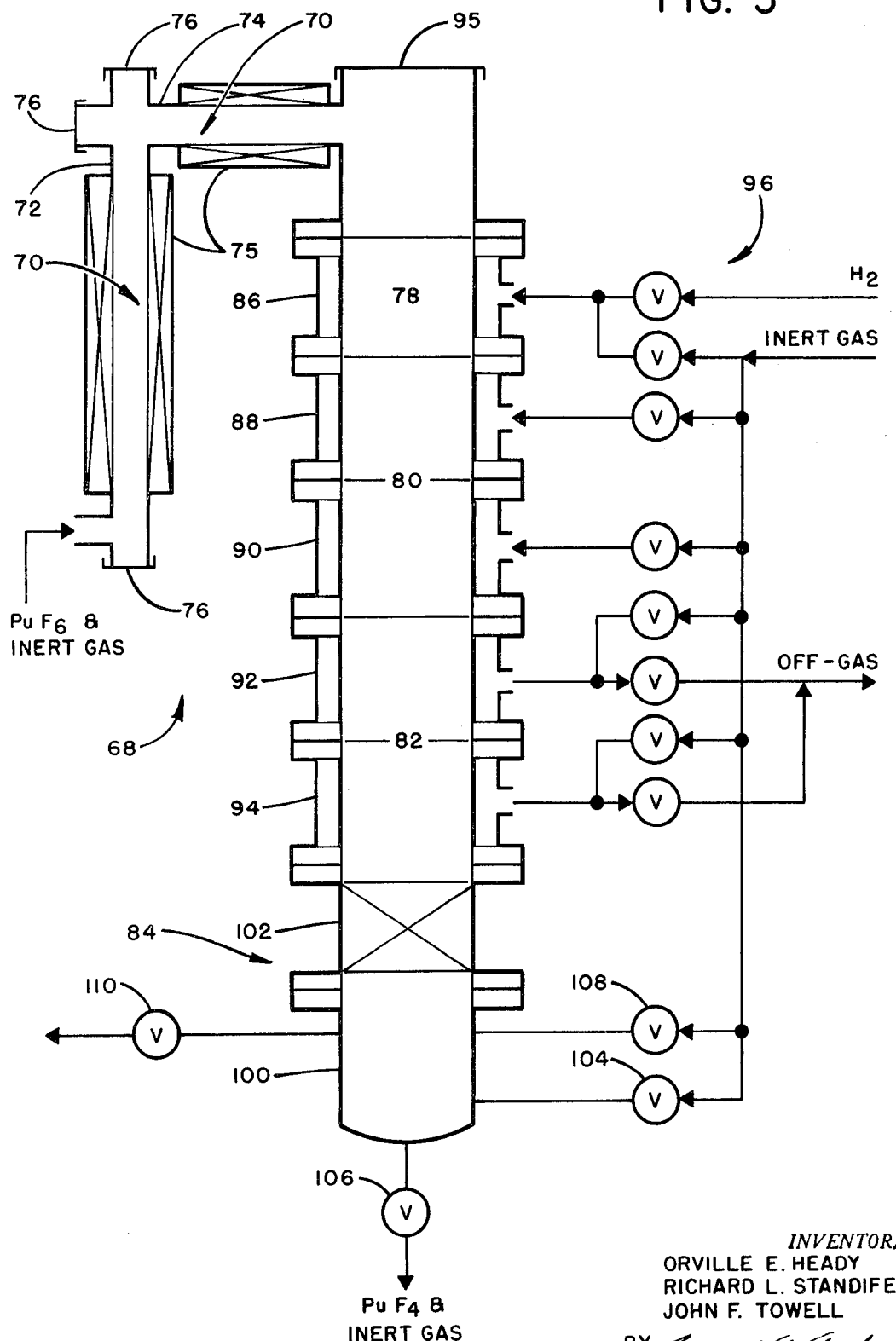

3,671,199
PLUTONIUM HEXAFLUORIDE REDUCTION
Orville E. Heady, Broomfield, John F. Towell, Denver, and Richard L. Standifer, Arvada, Colo., assignors to the United States of America as represented by the United States Atomic Energy Commission
Filed Mar. 4, 1969, Ser. No. 804,198
Int. Cl. B01j 1/14
U.S. Cl. 23—284
6 Claims

ABSTRACT OF THE DISCLOSURE

An apparatus and method for reducing plutonium hexafluoride to plutonium tetrafluoride by heating the plutonium hexafluoride in a first zone, then mixing the heated plutonium hexafluoride with hydrogen in a second zone and collecting solid plutonium tetrafluoride in a third zone, while removing gas and gaseous products from the second zone.

BACKGROUND OF INVENTION

Because of the high cost of plutonium and the general need for highly purified plutonium in its many uses, processes have been developed to reprocess plutonium scraps and residues or production wastes containing plutonium to recover and purify the plutonium. One such process, commonly referred to as an aqueous process, dissolves the scrap plutonium metal, plutonium compounds, or residues in nitric-hydrofluoric acid solutions, passes the solutions through ion exchange columns, precipitates and filters the plutonium as plutonium peroxide from the solutions, calcines the precipitate to plutonium dioxide, hydrofluorinates the dioxide to plutonium tetrafluoride, and then reacts the plutonium tetrafluoride with calcium or magnesium in bomb reduction furnaces to the purified plutonium metal. Such a process requires many steps and hand operations with consequent high cost and high potential radiation exposures to personnel. In addition, the process generates a high amount of aqueous and solid waste which may require still further processing.

An improved process utilizing volatile fluorides and fluid beds has now been developed which may be automatically operated continuously or semicontinuously with little direct personnel contact with or exposure to radioactive materials. This process produces an intermediate product of plutonium hexafluoride ($PuF_6$) which must be reduced to plutonium tetrafluoride ($PuF_4$) for later reaction in bomb reduction furnaces to plutonium metal.

Prior reduction processes and apparatus utilized to reduce compounds other than plutonium compounds were inadequate or inoperative when used to reduce $PuF_6$ for various reasons. With some processes, the $PuF_4$ produced was sintered in the process chambers and required extensive handling to be removed. With the same and other processes, the $PuF_4$ produced tended to build up and block passages within the process chambers, again requiring objectionable shut down and cleaning of the system. Further, some processes produced large amounts of $PuF_3$ which required either additional processing for conversion to $PuF_4$ or iodine boosting of the bomb reduction charge causing additional corrosion and recovery problems. Additional disadvantages of these prior systems included a high rate of usage of fluorine and hydrogen gas and consequently high caustic usage for scrubbing the additional HF produced.

SUMMARY OF INVENTION

In view of the limitations of the prior art, it is an object of this invention to provide a novel apparatus and process for the reduction of $PuF_6$ to $PuF_4$.

It is a further object of this invention to provide an apparatus and process which may be used continuously to reduce $PuF_6$.

It is a further object of this invention to provide an apparatus and process for the reduction of $PuF_6$ to $PuF_4$ with a substantially complete collection of the $PuF_4$.

It is a further object of this invention to provide an apparatus and process which reduces $PuF_6$ to substantially only $PuF_4$.

Various other objects and advantages will appear from the following description of embodiments of the invention, and the most novel features will be particularly pointed out hereinafter in connection with the appended claims.

The invention comprises an apparatus and method for reducing gaseous $PuF_6$ to solid $PuF_4$ by heating the $PuF_6$, then mixing the heated $PuF_6$ with hydrogen and thereafter collecting solid $PuF_4$ while removing gas and gaseous products therefrom.

DESCRIPTION OF DRAWINGS

Embodiments of the invention and their use are shown in the accompanying drawings, wherein:

FIG. 3 is a diagrammatic view of a modified embodiment of a hydrogen reductor.

DESCRIPTION OF INVENTION

Figure 1:
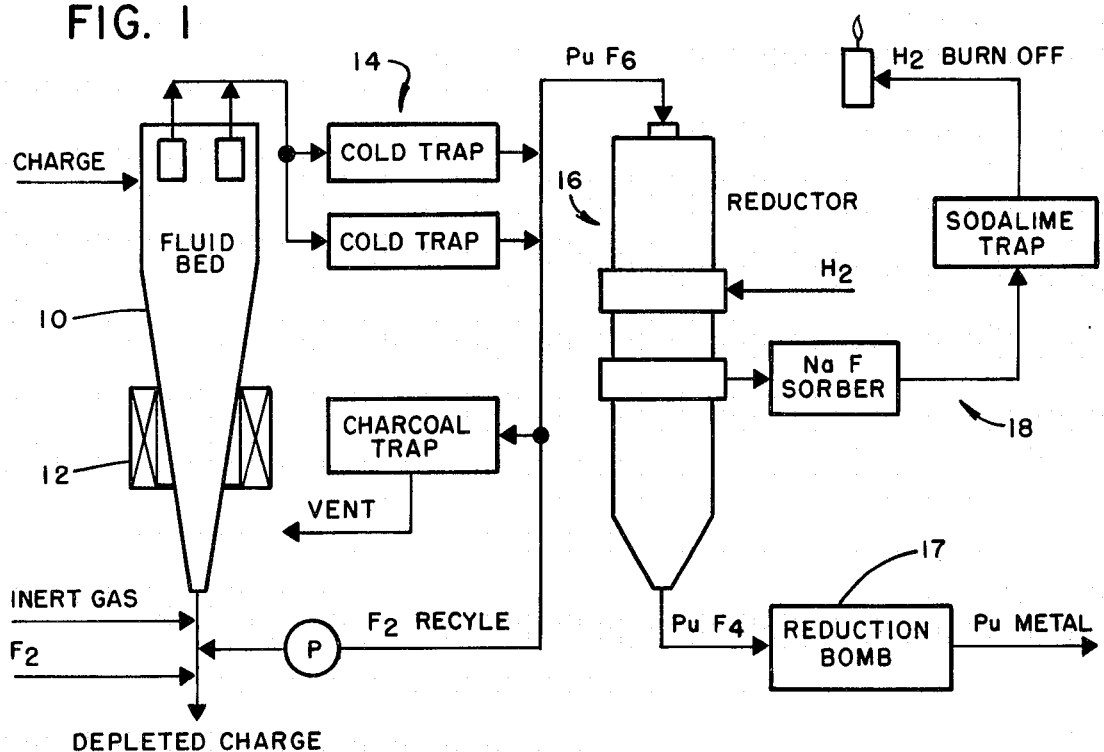
FIG. 1 is a schematic diagram of a fluid bed and bomb reduction process for purifying plutonium.

FIG. 1 illustrates an apparatus and process which may be used to reprocess and purify an initial charge of scrap plutonium and plutonium containing wastes and residues, where the plutonium may be in a suitable physical form for fluid bed operation, either as the metal or a compound such as $PuO_2$, plutonium fluorides, etc. The charge may be placed in a fluid bed 10, preferably a bed having a uniform taper with an angle of about 2° to provide complete charge agitation from top to bottom. Incomplete agitation may result in a temperature excursion from the exothermic $PuO_2$ to $PuF_4$ reaction to a temperature which may sinter the charge or portions thereof and impede or prevent further reaction. Fluid bed 10 may be appropriately heated as required by the process by heater 12 while feeding fluorine gas through the bed. The resulting effluent from the fluid bed, generally a mixture of fluorine and $PuF_6$ gases, is then filtered and transmitted through a series of primary and backup cold traps 14 where the $PuF_6$ condenses and collects. The fluorine gas may be recycled as shown. Fluid bed depletion rates may be kept high and uniform by external vibration or shocking of the fluid bed vessel and by frequent backblowing of the filters with an inert gas or fluorine.

Periodically, the fluid bed 10 reaction may be discontinued and the fluorine gas purged from the system with a suitable inert gas. An inert carrier gas (argon or nitrogen) may then be used to sweep $PuF_6$ from cold traps 14, by heating the cold traps if necessary, into a reductor 16 together with molecular hydrogen as will be described more fully below with respect to FIGS. 2 and 3. The effluent gas from reductor 16 may be passed through suitable traps 18 to remove any $PuF_6$ not decomposed in the reductor and hydrogen fluoride resulting from the reaction in the reductor. Excess hydrogen may be burned and vented to the atmosphere after suitable scrubbing and filtering. The traps 18 may include sodium fluoride sorbers, caustic scrubbers and charcoal traps as required by the volume and constituents of the effluent.

Purified solid $PuF_4$ may be removed from reductor 16 and reduced in an appropriate reduction bomb 17 to purified plutonium metal.

This system may be operated in essentially continuous manner by providing a suitable charge feed mechanism to fluid bed 10, such as a screw-type feeder and hopper, together with a mechanism for continuous or intermittent removal of the depleted charge. Further, additional cold traps may be connected with appropriate valving and couplings in parallel with the cold traps 14 shown to permit the intermittent loading and unloading of separate traps into the reductor. The reductor and essentially continuous operation will be described in greater detail with respect to FIG. 3.

The system of FIG. 1 with a 2-inch diameter fluid bed and a 2-inch diameter reductor has exhibited the following operating characteristics;

| | |
|---|---|
| Bed depletion | 98.1%. |
| Depletion rate | 60 to 250 g. Pu/hr. |
| Fluorine efficiency | 2.7 lbs. $F_2$/kg. Pu. |
| Cold trap efficiency | 99.9%. |
| $PuF_6$ to $PuF_4$ reduction | 250 to 500 g. Pu/hr. |
| $PuF_6$ reduction efficiency | 99+%. |
| Hydrogen usage | 0.067 lb. $H_2$/kg. Pu. |

Additional capacity may be achieved by increasing the size and/or the number of the various apparatus.

Figure 2:
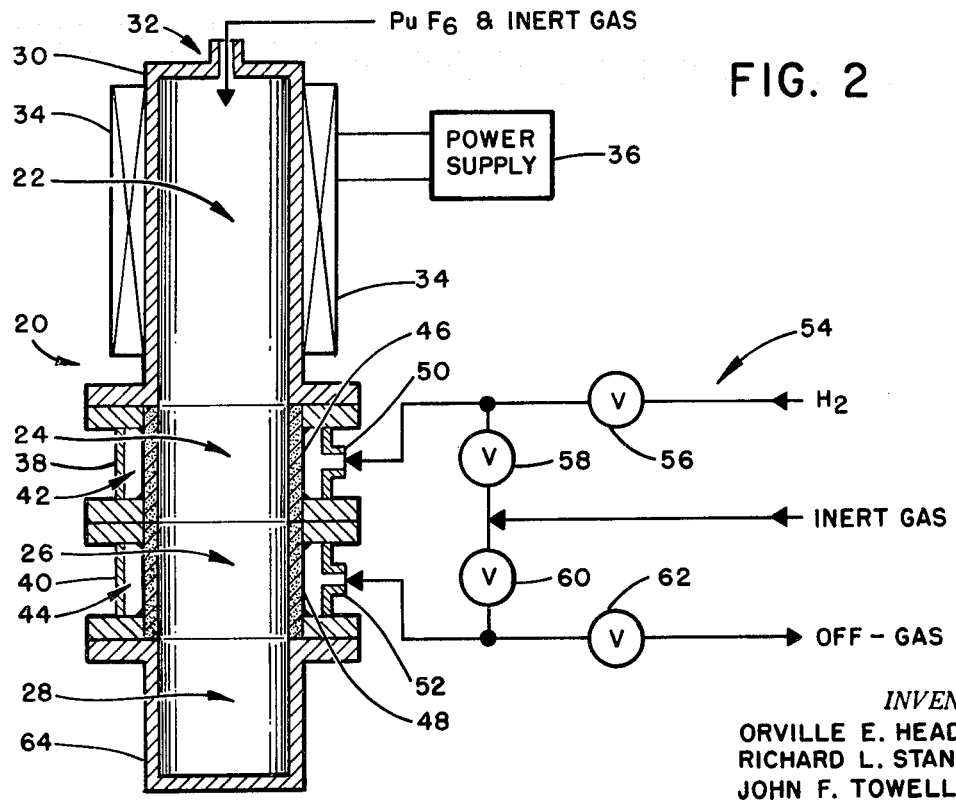
FIG. 2 is a cross-sectional and partially diagrammatic view of an embodiment of a hydrogen reductor which may be used in the process of FIG. 1.

Reductors which may be used in the system of FIG. 1 are shown in greater detail in FIGS. 2 and 3. In FIG. 2, the reductor includes a reductor vessel 20 having a heating zone 22, a gas mixing and reaction zone 24 a gas removal zone 26 and a product collection zone 28. The heating zone 22 is enclosed by a tubular member 30 having an entry or nozzle 32 at one end and a flanged opening at the other end facing mixing and reaction zone 24. Tubular member 30 may be heated by any suitable means such as by a heater 34 powered by an appropriate power supply 36. Heater 34 may be any resistance or the like heater in any form such as resistance tape wound about member 30.

Mixing and reaction zone 24 and gas removal zone 26 may each be enclosed by similar annular gas dispersing filter units or members 38 and 40 connected or fastened together by appropriate fasteners and flange portions. The filter include annular chambers 42 and 44 separated from zones 24 and 26, respectively, by porous, tubular filter elements 46 and 48. One or more appropriate gas inlet or outlet ports may be provided to chambers 42 and 44, such as ports 50 and 52.

Filter members 38 and 40 may be formed in a generally spool shape as shown as a machined part or from individual elements welded together. Chambers 42 and 44 may be formed by welding or brazing or otherwise attaching annular filter elements 46 and 48 to an interior surface of the annular end portion of each member. Filter elements 46 and 48 may be made of any appropriate material which will withstand the environment within the reductor vessel without corrosion, cracking, or contaminating the process product when subjected to high temperatures and corrosive gas and which will provide the desired gas dispersion and prevent solid materials or products from escaping the vessel. Examples of appropriate materials include pressed sintered powders or pressed fibers of nickel, nickel alloys, and certain ceramics.

The reducing gas, molecular hydrogen, and if desired a diluent gas mixed therewith such as an inert gas like argon or nitrogen, may be fed into filter member 38 through port 50 and the off-gas from the process removed from filter member 40 through port 52 by an appropriate gas control arrangement 54, such as with valves 56, 58, 60 and 62.

The product collection zone may be enclosed by a cup-like canister or container 64 removably attached to filter member 40 by any conventional fasteners or clamps (not shown) which may permit the removal of container 64 from the rest of reductor vessel 20. The solid product, $PuF_4$, may fall and collect in container 64 during process operation and be removed from the canister when convenient or required during a shut down of the process.

The reductor 20 may be operated by first heating zone 22 by heater 34 to an appropriate temperature which will heat the $PuF_6$ feed gas to a reaction temperature at the flow rate of the $PuF_6$ and carrier gas (an inert gas such as argon or nitrogen or mixtures thereof). Valves 56 and 58 may be opened and adjusted to provide a desired hydrogen/inert gas mixture to mixing and reaction zone 24 of reductor vessel 20. Filter element 46 may disperse and distribute this mixture throughout zone 24 to ensure a complete mixing with the $PuF_6$ gas so that reduction reaction occurs substantially uniformly throughout zone 24. Valve 62 may be opened to permit the off-gases, at this point hydrogen, hydrogen fluoride and an inert gas to be removed from zone 26 of the reductor vessel to appropriate filter and venting means such as traps 18 shown in FIG. 1. After the reduction reaction begins, valve 62 may be periodically closed and valve 60 opened to create a back-flow through filter element 48 to remove solid product material which may collect or tend to collect thereon. The $PuF_6$ gas may then be fed or swept together with the inert carrier gas through heating zone 22 of reductor vessel 20 from some appropriate source or storage such as from cold trap 14 shown in FIG. 1. The heated $PuF_6$/inert carrier gas mixture may then pass through the diffused hydrogen/inert diluent gas mixture in mixing and reaction zone 24 adjacent filter member 38. The $PuF_6$ gas may then be reduced in zone 24 to form solid $PuF_4$ and HF gas with the following reaction;

$$PuF_6 + H_2 = PuF_4 + 2HF$$

Solid $PuF_4$ product may then be collected in container 64 from zone 24 and filter element 48. The off-gas stream at this point may comprise a mixture of inert gas, $H_2$ and HF and possibly some $PuF_6$. If desired, the process may be periodically discontinued, reductor vessel 20 purged of $PuF_6$ and $H_2$ with an inert gas and the $PuF_4$ product removed from container 64.

It has been found that very satisfactory results are obtained if the temperature of the $PuF_6$ gas is kept within a particular temperature range to ensure complete reduction of $PuF_6$ to $PuF_4$ while minimizing reduction to the less desirable $PuF_3$ form. The percent reduction of $PuF_6$ and percent $PuF_4$ product produced for various feed gas temperatures are illustrated in the following table;

| Feed gas temperature, °C. | Percent reduction | Percent $PuF_4$ |
|---|---|---|
| 150 | 25 | 98 |
| 200 | 75 | 98 |
| 300 | 99+ | 98 |
| 400 | 99+ | 20–50 |

The desired temperature range is from about 250° C. to about 350° C. with a preferred temperature of about 300° C.

A reductor vessel 20 having an overall length of about 48 inches and an inside dimension of about 2 inches gives good results. The intermediate portions or zones may have dimensions as follows:

| | Inches |
|---|---|
| Heating zone length | 30 |
| Mixing zone length | 6 |
| Gas removal zone length | 6 |

The reductor vessel parts and members may be made of an appropriate material which will not unduly corrode or contaminate the process products under the process environment such as nickel or nickel alloys.

The $PuF_6$/inert gas mixture having a mole ratio of about 1/7 may be introduced at a flow rate of about 0.2 standard cubic feet per minute (s.c.f.m.) using a vessel of above noted size and mixed with an $H_2$/inert gas mixture having a mole ratio of about 1/1 flowing at a rate of about 0.2 s.c.f.m. through filter element 46.

The various portions and steps of the process may be monitored by conventional neutron counting techniques to determine the condition and amount of plutonium material in each step and location of the process. Also, careful control of process materials should be maintained to insure that the fissionable materials do not reach criticality at any point of the process.

Additional processing capacity may be achieved by increasing the size of the reductor vessel and by operating the process on a continuous basis. A reductor vessel 68 having this increased capacity is shown diagrammatically in FIG. 3.

As there shown, in order to ensure the proper heating of the $PuF_6$ feed gas, it may be desirable to utilize a heating zone having an inside dimension smaller than the inside dimensions of the other zones of the reductor vessel. For example, the heating zone 70 in FIG. 3 may be formed from a series of tubular members 72 and 74 connected in series and heated by suitable heating means 75. Each of the tubular members 72 and 74 may be connected together in separate straight sections, as shown, closed at each end by appropriate removable end caps 76 which may provide access to the interior of the heating zone for periodic cleaning or for any other desired purpose.

The heated $PuF_6$ feed gas may then be fed into a larger dimensioned portion of reductor vessel 68 having a mixing and initial reaction zone 78, an additional or intermediate reaction zone 80, a gas removal zone 82 and a solid product collection zone 84. The intermediate reaction zone 80 may permit a more complete reduction of the $PuF_6$ feed gas before the off-gas is removed. The filter members 88 and 90 (similar construction to those of FIG. 2) of intermediate reaction zone 80 may be continuously or periodically backblown with inert gas to minimize or prevent any buildup of solid products on the members. It may also be desirable to provide a very dilute mixture of molecular hydrogen through filter members 88 and 90 if additional hydrogen is needed to complete the reduction process.

Each of the zones 78, 80 and 82 may be formed by one or more filter members as described with respect to FIG. 2, such as by identical or similar filter members 86, 88, 90 and 94. These filter members may be operated in the same manner as described in FIG. 2, except that where more than one filter member is provided for a particular zone, the respective filter members may be operated intermittently and alternately in their desired functional or operating mode and sequentially cleared or cleaned by backblowing with inert gas. For example, in gas removing zone 82, filter member 92 may be backblown with continuous or short bursts of high pressure inert gas while member 94 vents off-gas from the process. Further cleaning of the filter members may be achieved by external shocking or vibration of the reductor vessel.

These functions may be provided by any appropriate gas distributing and valving system such as by system 96, as shown, using either manual or remote operated valves.

The upper end of the portion of reductor vessel 68 adjacent mixing zone 78 may be provided with a removable end closure 95 for access to zones 78 through 84 if desired.

The solid product collection zone 84 may include a product collecting container 100 separated from gas removing zone 82 by a valve 102. Valve 102 may be any appropriate valve mechanism (e.g., a ball valve) which may permit the solid product ($PuF_4$) to be readily delivered or conveyed into container 100 while permitting the periodic isolation of container 100 from the rest of the reductor vessel without stopping or impeding the reduction process. The solid product may be removed from container 100 by detaching the container from the rest of the reductor vessel as described with respect to FIG. 2.

It is desirable, however, in a continuous operation that the product be removed without physically detaching container 100 from the vessel. Such an operation may be achieved by a pneumatic system, as shown, including valves 104, 106, 108 and 110 and appropriate piping or tubing. Any appropriate system may be used which will provide the desired function.

With the system shown, after some desired amount or volume of solid product is collected in container 100, valve 102 may be closed and the container isolated from the reduction process and the gases associated therewith. Valves 108 and 110 may be opened and container 100 purged of any residual process gases. The off-gas from valve 110 may be appropriately filtered and vented by any conventional means such as directly through traps 18 in FIG. 1 or it may be fed back through reductor vessel 68 and filter members 92 and 94 to an off-gas filtering system. When container 100 has been purged, valves 108 and 110 may be closed and valve 104 and 106 opened. The resulting inert gas flow through valves 104 and 106 may pneumatically convey the solid $PuF_4$ product collected in container 100 through valve 106 to some desired final or intermediate collecting point or directly to the next portion of an overall process such as the reduction bomb 17 shown in FIG. 1.

Other than the intermittent and alternate operation of the filter members in each zone, and the removal of product from the collection zone, the operation of the reductor vessel 68 may be the same or similar to the operation of reductor vessel 20 in FIG. 2.

The above described apparatus and process may be used to efficiently reduce gaseous $PuF_6$ to solid $PuF_4$ with relatively little and easily handled waste by-products and with minor amounts of $PuF_3$ produced therewith. Further, this apparatus and process may be readily incorporated in a continuous or semicontinuous process for recovering purified plutonium metal from a wide range of feed materials.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A plutonium hexafluoride hydrogen reductor comprising means for directing plutonium hexafluoride to a first zone and for flowing said plutonium hexafluoride sequentially through respective zones of said reductor, means for preheating said plutonium hexafluoride to a reaction temperature of from about 250° C. to 350° C. at said first zone, means including an annular porous wall for supplying and directing hydrogen substantially throughout the length of said porous wall and generally radially into a second zone encircled by said porous wall downstream from said first zone and for mixing said hydrogen with said preheated plutonium hexafluoride at said second zone, means for removing gaseous products from said second zone, and means for collecting plutonium tetrafluoride in a third zone downstream from said second zone.

2. The reductor of claim 1 wherein said directing means includes means for distributing said hydrogen under pressure over the outer surface of said porous wall.

3. The reductor of claim 1 wherein said removing means includes an annular porous member downstream from said porous wall of said hydrogen directing and mixing means and forming a part of said wall encircling said second zone and means disposed adjacent said porous member for collecting gas passing therethrough.

4. The reductor of claim 3 wherein said removing means includes a plurality of axially aligned annular porous members downstream from said porous wall of said hydrogen directing and mixing means.

5. The reductor of claim 1 including an annular porous member disposed between said second zone and said removing means and including means for distributing inert gas under pressure over the outer surface of said porous member.

6. The reductor of claim 1 wherein said collecting means includes means for isolating said third zone from the remainder of said reductor and means for pneumatically removing said plutonium tetrafluoride from said collecting means.

References Cited

UNITED STATES PATENTS

| | | | |
|---|---|---|---|
| 2,898,187 | 8/1959 | Shaw et al. | 23—353 |
| 2,907,629 | 10/1959 | Smiley et al. | 23—353 |
| 2,907,630 | 10/1959 | Lawroski et al. | 23—352 |
| 2,911,290 | 11/1959 | Jonke et al. | 23—352 |
| 3,413,099 | 11/1968 | Rode | 23—353 |
| 3,450,509 | 6/1969 | Manevy | 23—344 |
| 3,518,062 | 6/1970 | Delange et al. | 23—284 |

OTHER REFERENCES

Navratil et al.: Static Reactor Reduction of Plutonium Hexafluoride with Iodine and Hydrogen, Report No. RFP-993, Sept. 6, 1968.

CARL D. QUARFORTH, Primary Examiner

F. M. GITTES, Assistant Examiner

U.S. Cl. X.R.

23—252, 260, 344, 353